(12) United States Patent
Copeland et al.

(10) Patent No.: US 8,490,273 B1
(45) Date of Patent: Jul. 23, 2013

(54) PIPE JOINT GASKET AND METHOD OF USING SAME

(75) Inventors: Daniel A. Copeland, Bessemer, AL (US); Michael C. Keel, Birmingham, AL (US)

(73) Assignee: McWane Global, Birmingham, AL (US)

( * ) Notice: Subject to any disclaimer, the term of this patent is extended or adjusted under 35 U.S.C. 154(b) by 340 days.

(21) Appl. No.: 12/901,261

(22) Filed: Oct. 8, 2010

(51) Int. Cl.
*B23P 11/02* (2006.01)

(52) U.S. Cl.
USPC ............................................................. 29/451

(58) Field of Classification Search
USPC .......... 294/451, 450, 505, 506, 428; 277/314, 277/627, 616; 285/105, 231
See application file for complete search history.

(56) References Cited

U.S. PATENT DOCUMENTS

| | | | | |
|---|---|---|---|---|
| 5,219,189 A * | 6/1993 | Demoisson et al. | .......... | 285/105 |
| 5,295,697 A * | 3/1994 | Weber et al. | .................. | 277/616 |
| 5,464,228 A * | 11/1995 | Weber et al. | .................. | 277/615 |
| 6,688,652 B2 * | 2/2004 | Holmes et al. | ................. | 285/105 |
| 7,784,798 B2 * | 8/2010 | Walworth et al. | ............. | 277/615 |
| 2013/0043656 A1 * | 2/2013 | Copeland et al. | ............. | 277/314 |

* cited by examiner

*Primary Examiner* — John C Hong
(74) *Attorney, Agent, or Firm* — C. Brandon Browning; Maynard Cooper & Gale, PC (57) ABSTRACT

A gasket for preventing separation of interconnected pipes without damaging the pipes. The gasket includes a compressible body having a plurality of metal segments partially embedded therein. Each of the metal segments includes a row of exposed teeth configured for engaging a spigot end of a pipe and a trough configured for pivotably engaging a bead on a bell. The trough is further configured for shearing or deforming the bead and inhibiting over-pivoting of the segment about the bead when the pipes are partially withdrawn away from one another, for example, during over-pressurization of the pipes.

12 Claims, 6 Drawing Sheets

PIPE JOINT GASKET AND METHOD OF USING SAME

FIELD OF THE INVENTION

The present invention is directed to a pipe joint gasket and more particularly to a pipe joint gasket including an arrangement of metal segments configured for preventing the separation and fracturing of interconnected, telescoping pipes during fluid over-pressurization.

BACKGROUND OF THE INVENTION

Pipe joint gaskets including anti-slip segments for preventing the separation of interconnected, telescoping pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced uniformly around its inner perimeter. The toothed metal segments bite into the outer surface of the spigot of the inserted pipe and prevent withdrawal of the inserted pipe from a bell end of the other pipe. The metal segments pivot about a retainer bead in the bell end of the other pipe to allow the spigot end to be inserted into the bell end of the other pipe while preventing withdrawal of the inserted pipe under high fluid pressure conditions.

A shortcoming of such gaskets is that during fluid over-pressurization of the interconnected pipes, the excessive axial thrust force generated by the resulting hydrostatic pressure can cause the metal segments to over-rotate about the retainer bead resulting in destructive radial loads being exerted through the metal segments upon the inner axial surface of the bell end and the outer axial surface of the spigot end. In many instances, these radial loads are great enough to fracture the spigot and bell ends of the pipes.

SUMMARY OF THE INVENTION

The present invention is directed to a gasket for preventing the separation and fracturing of telescoped pipes during fluid over-pressurization of the pipes. The gasket is designed for use with pipes that comprise a spigot end and a bell end having a gasket receiving groove with a retainer bead and a front wall. According to one aspect of the invention, the gasket includes a compressible body having a sealing portion and foot portion containing a plurality of metal segments circumferentially spaced and embedded therein. Each of the metal segments includes a row of exposed teeth extending radially inwardly therefrom, a single tooth extending outwardly from the side of the metal segment and a trough adjacent to the single tooth. The gasket is arranged within the gasket-receiving groove with the foot portion disposed between the front wall and the retainer bead and the retainer bead being received within the trough.

In use, the spigot end is inserted into the bell end of the gasket. This causes the compression of the sealing portion of the gasket between the spigot end and the bell end and the rotation of the metal segments about the retainer bead in the direction of insertion of the spigot end. Upon pressurization of the interconnected pipes, an axial thrust force is created which attempts to separate the pipes. This occurs by the spigot end sliding axially out of the bell end which in turn causes the teeth of the metal segment to engage the outer surface of the spigot. With the teeth engaged with the spigot end as the spigot moves axially out of the bell end, the trough of each metal segment is caused to engage and rotate about the retainer bead causing the teeth to further impinge upon the spigot end until the axial thrust force is overcome by the wedging action of the segment between the retainer bead and the spigot. This way, separation of the interconnected pipes is prevented during pressurization.

On occasion, the interconnected pipes are over-pressurized. When this occurs, the increased hydrostatic pressure causes in an increase in the axial thrust force attempting to separate the interconnected pipes. This, in turn, causes the metal segments to rotate farther about the retainer bead. The additional rotation of the segment results in an increase in the radial load and a decrease in the axial load exerted between the bell and spigot ends of the interconnected pipes. In the event the radial load component becomes too large, the spigot or bell ends can fail and fracture.

To prevent fracturing of the pipe ends caused by over-pressurization induced over-rotation of the metal segment, the present invention provides for a metal segment having a trough that is configured to at least partially shear or deform the retainer bead following a desirable amount of rotation thereabout. This is accomplished by increasing the radius of the trough which, in turn, decreases the trough depth and the arc length of the trough. Prior art metal segments used with 12 inch to 24 inch radius gaskets have a trough radius that is less than 0.18 inch, an arc length of 0.503 inch or more and an included angle of the radius of 169° or more. By increasing the trough radius and decreasing the arc length and included angle of radius of the present invention, the retainer bead of the bell end is more shallowly received within the trough than in prior art gasket metal segments. Since the retainer bead is shallowly received within the trough, it engages less of the retainer bead than if the trough had a greater radius, i.e., it engages the bead tip rather than the bead base. This decreases the amount of the axial thrust force required to axially shear or deform the bead since less of the bead is engaged by the trough. By decreasing the amount of axial thrust force required to shear or deform the retainer bead, the metal segments have a tendency to rotate less about the bead than current metal segments, but enough to cause at least one tooth of the row of teeth to adequately bite into the spigot. After shearing and/or deformation of the retainer bead, the metal segment translates toward and engages with the radially extending front wall of the retainer groove. In other words, once the axial thrust force reaches a certain threshold upon fluid over-pressurization, rather than supporting the over-rotation of the metal segments about the bead resulting in the generation of excessive radial loads and thereby causing the segment to dig too deeply into the spigot end, the retainer bead gives way and the metal segments are shifted toward the front wall. When the metal segments shift forward, the single tooth of each of the metal segments is caused to engage the radially extending front wall of the bell end. This arrangement substantially decreases the radial loads experienced within the pipe joint.

More particularly, during pressurization of the pipes, a first load path having an angle relative to the spigot end is created between the bell end and the spigot end through each of the metal segments. As a metal segment rotates about the bead due to pipe pressurization, this load path angle increases which, in turn, increases the radial load exerted between the axial surfaces of the bell and spigot. It is this radial load created by the over-rotation of the metal segments that can cause fracturing of the pipe joint since it is directed into the axial surfaces of the spigot and bell ends at angles up to 90°, where the radial load is at its greatest. In the present invention, prior to the first load path angle becoming too large, the retainer bead is sheared or deformed thereby eliminating or decreasing the magnitude of the first load path while establishing a second, more desirable load path.

Specifically, as the retainer bead is sheared or deformed, the segment discontinues rotation about the bead and translates or shifts toward the front wall of the bell end until the single tooth of the metal segment engages the front wall. Upon engagement of the single tooth with the front wall of the bell end, a second load path is created through the segment and between the axial surface of the spigot and a radial surface of the bell, i.e., front wall. The second load path has an angle relative to the spigot that is substantially less than the angle of the first load path. By creating a second load path having an angle relative to the spigot that is substantially less than the angle of the first load path, the radial load component of the overall load experienced between the interconnected pipes by the over-pressurization of the pipes is decreased. Consequently, the radial load imparted by the radially inwardly extending teeth of the metal segments on the spigot end is decreased thereby reducing the likelihood that the metal segments will bite too deeply into the spigot end.

DETAILED DESCRIPTION OF PRESENTLY PREFERRED EMBODIMENTS

Figure 3:
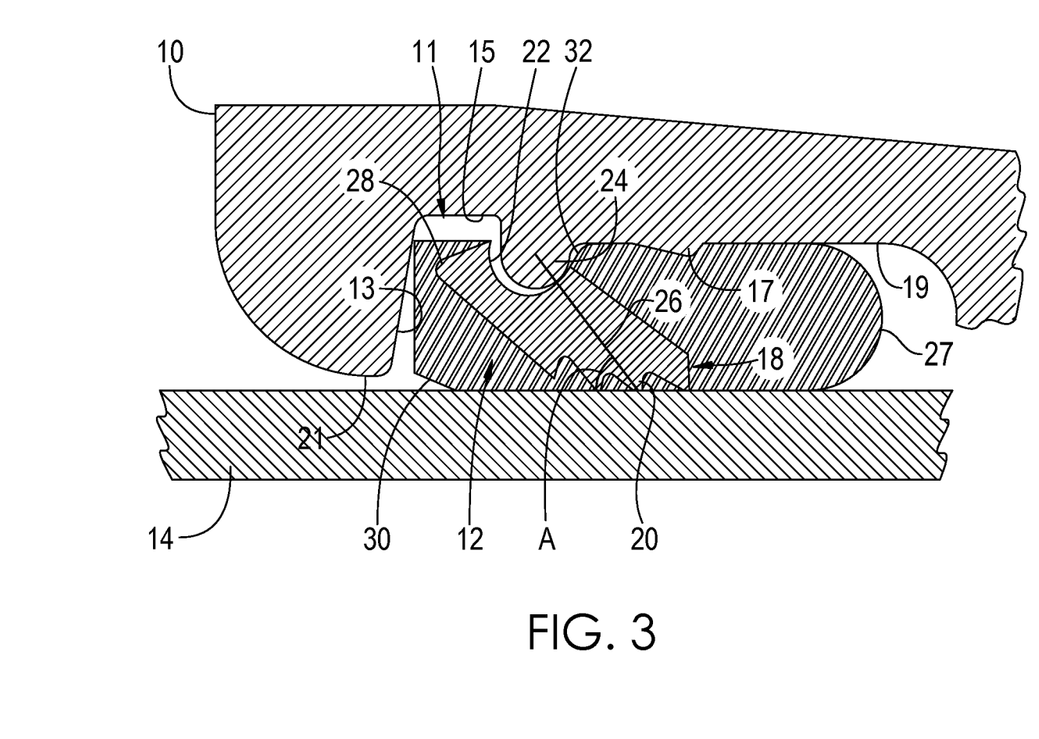
FIG. 3 is a fragmented cross-sectional view of a bell end of one pipe using the gasket of the present invention and of a spigot end of another pipe showing the arrangement of the gasket following pressurization of the interconnected pipes.
Figure 4:
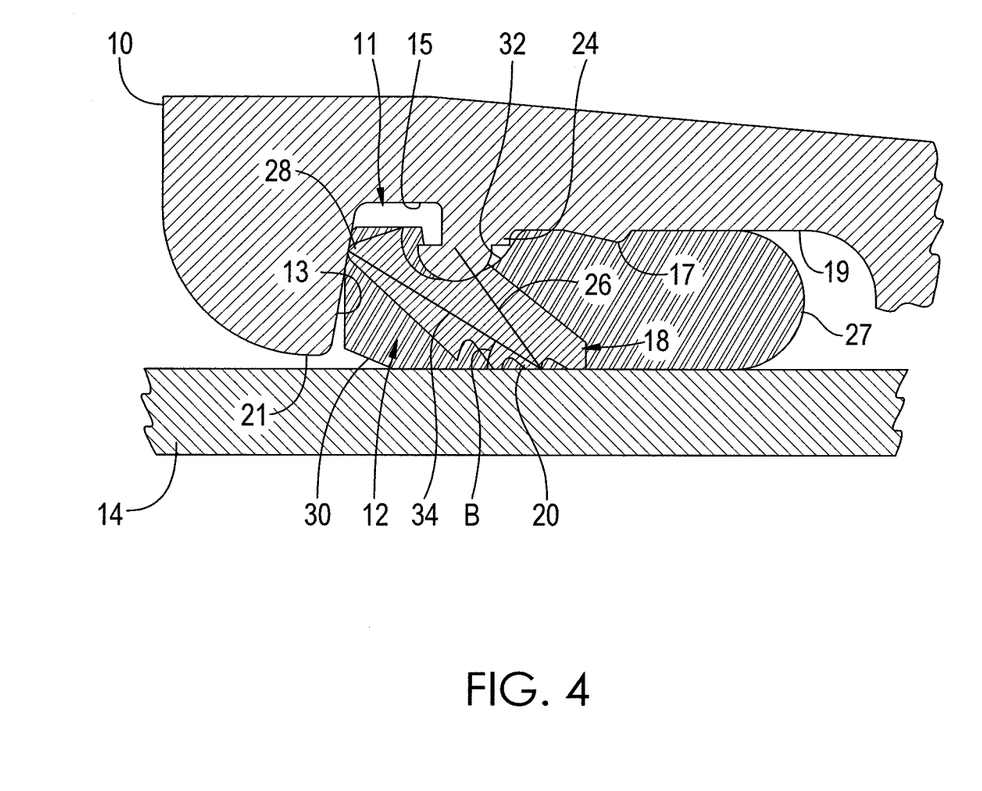
FIG. 4 is a fragmented cross-sectional view of a bell end of one pipe using the gasket of the present invention and of a spigot end of another pipe showing the arrangement of the gasket following over-pressurization of the interconnected pipes and resulting deformation of the retainer bead.
Figure 4A:
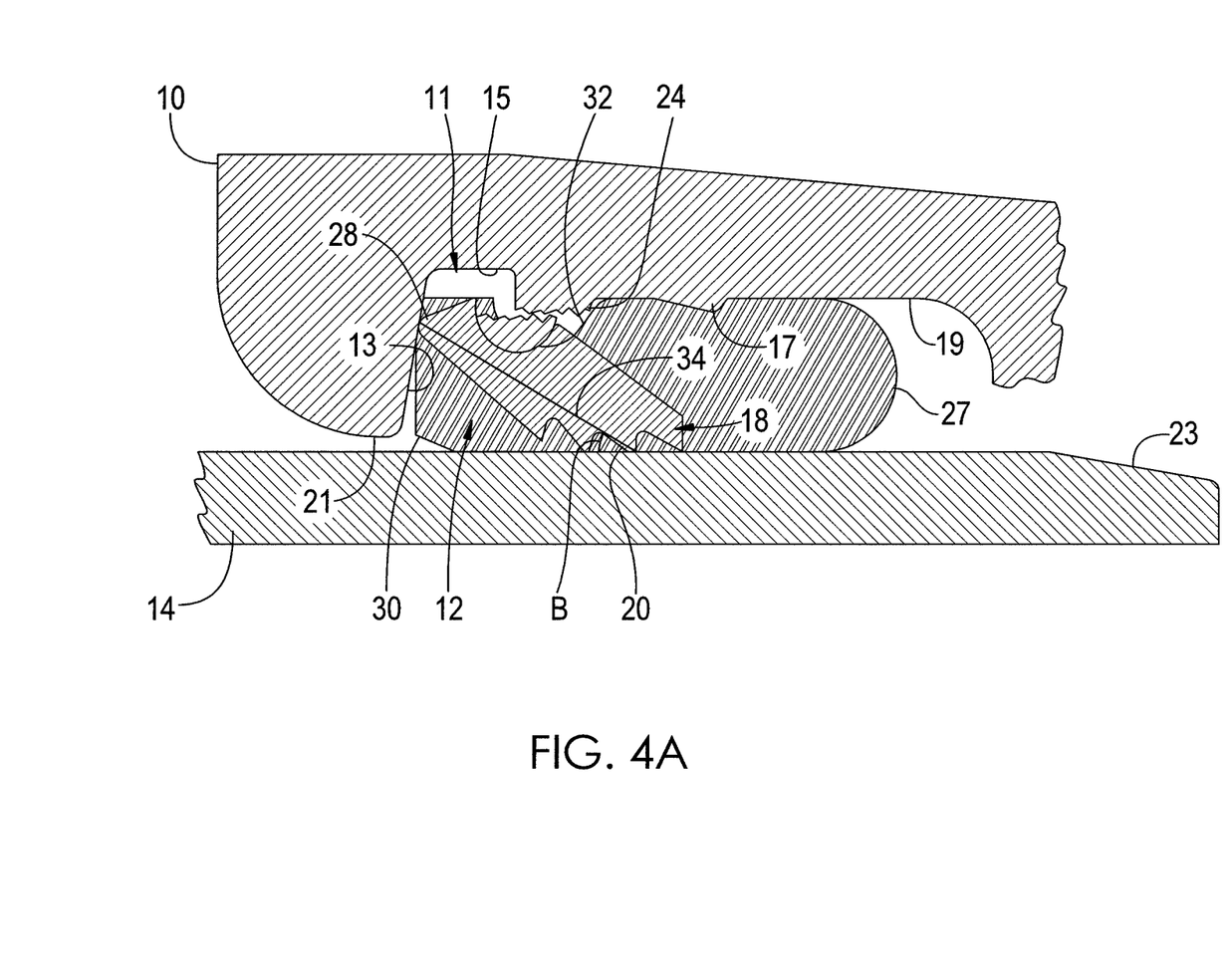
FIG. 4A is a fragmented cross-sectional view of a bell end of one pipe using the gasket of the present invention and of a spigot end of another pipe showing the arrangement of the gasket following over-pressurization of the interconnected pipes and the resulting fracture of the retainer bead.
Figure 5:
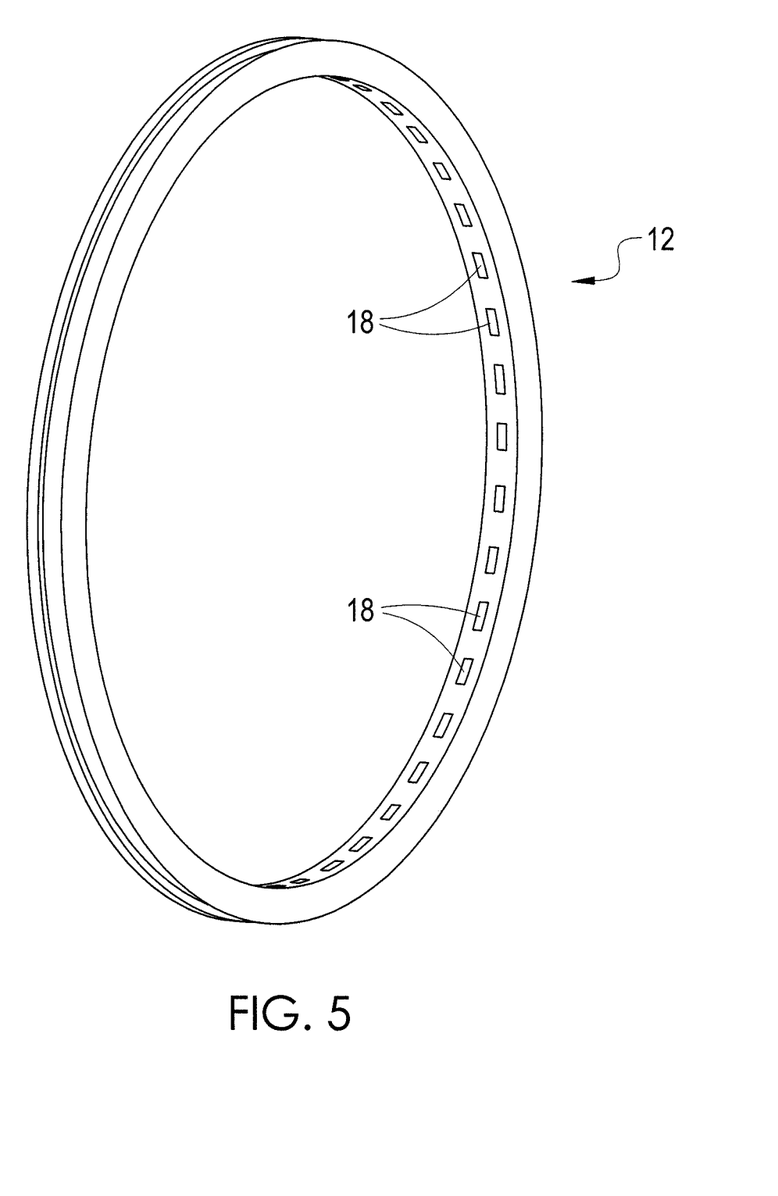
FIG. 5 is a top view of a gasket of the present invention showing the placement of metal segments around its periphery.

FIGS. 1 through 5 depict a fragmented cross-sectional view of a bell end 10 of one pipe using a gasket 12 of the present invention, a spigot end 14 of another pipe entering the pipe bell and the operation of gasket 12 upon the fluid pressurization and over-pressurization of a pipe joint 16 created between bell end 10 and spigot end 14. In particular, these figures illustrate the arrangement and operation of metal segments 18 in gasket 12 relative to bell end 10 and spigot end 14 during the formation, fluid pressurizing and fluid over-pressurization of joint 16. FIG. 5 is provided to show the circumferential arrangement and spacing of metal segments 18 throughout gasket 12.

Figure 1:
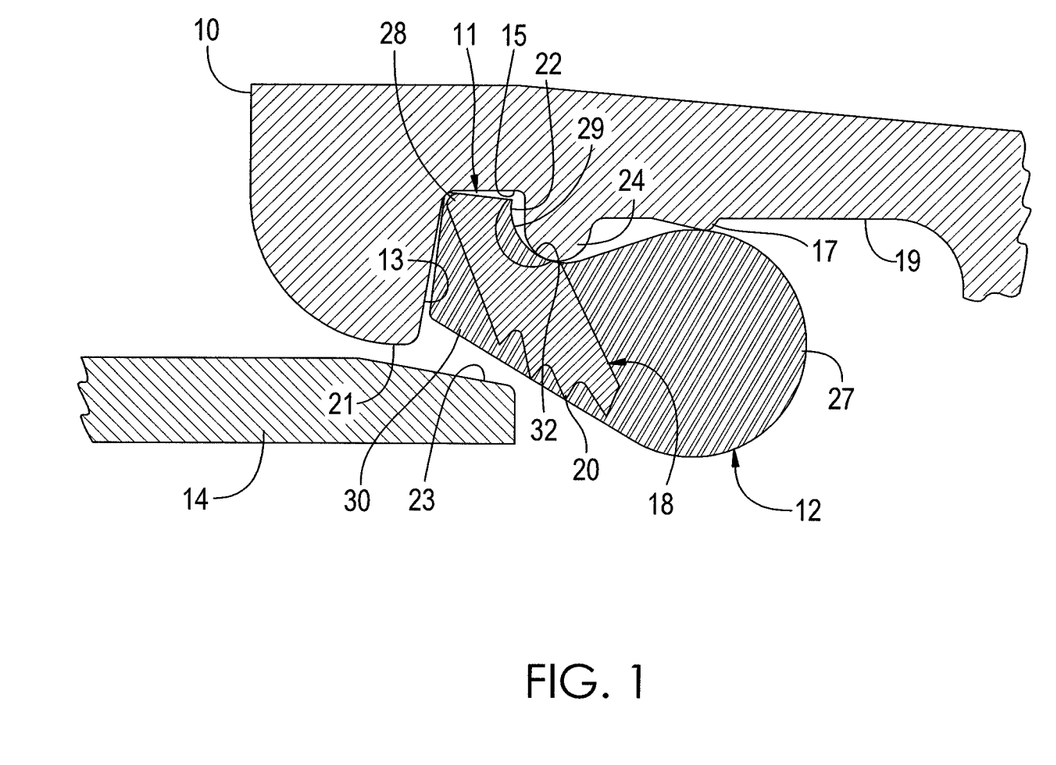
FIG. 1 is a fragmented cross-sectional view of a bell end of one pipe using the gasket of the present invention and of a spigot end of another pipe entering the pipe bell.
Figure 2:
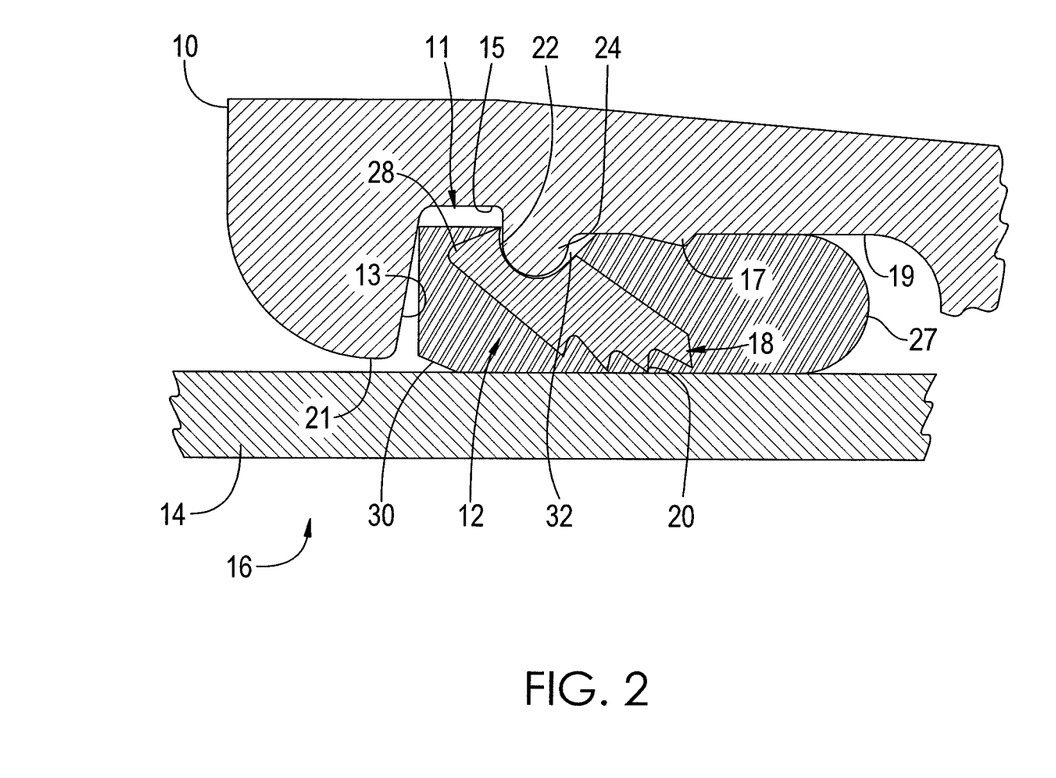
FIG. 2 is a fragmented cross-sectional view of a bell end of one pipe using the gasket of the present invention and of a spigot end of another pipe fully inserted to the bell end of the first pipe.

Generally, gasket 12 is arranged for inhibiting leakage about joint 16 between the inside walls of bell end 10 and the outside wall of spigot end 14. More particularly, as illustrated in FIGS. 1 and 2, the inner surface of bell end 10 includes a retainer groove 11 bounded by a radially extending front wall 13 and an axially extending retainer wall 15, and a compression rib 17 which extends radially inward from an axially extending sealing wall 19. Extending radially inward from retainer wall 15 between front wall 13 and rib 17 is a retainer bead 24. Gasket 12 is positioned within retainer groove 11 with an outer face thereof being arranged adjacent to axially extending retainer wall 15, a heel portion 30 arranged between front wall 13 and retainer bead 24, and a sealing bulb portion 27 arranged against compression rib 17. The outer face of gasket 12 includes an annular groove 32 formed between heel portion 30 and sealing portion 27 that receives retainer bead 24 for maintaining or locking gasket 12 within retainer groove 11 during joint 16 assembly.

Inserted into gasket 12 are a plurality of metal segments 18. As depicted in FIG. 4, segments 18 are spaced apart equally in a circumferential direction around the periphery of gasket 12. Metal segments 18 are firmly vulcanized into radial grooves found within heel portion 30 in gasket 12. The number of metal segments 18 inserted into gasket 12 varies depending upon the anticipated fluid pressure at joint 16 and the size of the pipes involved. Each metal segment 18 comprises a spigot side W, a flat bell side X, a flat sealing portion side Y and a flat heel side Z. A row of four spigot teeth 20 extend along the entire length of spigot side W from a heel portion 30 of gasket 12 toward an axially extending inner surface of gasket 20. Spigot teeth 20 are designed to bite into the outer axial surface of spigot end 14 when inserted into bell end 10, and may be arranged in a straight line or in an arc for facilitating pivoting of segment 18 on spigot end 14. A rounded bell tooth 28 is formed by the intersection of bell side X and heel side Z. Bell tooth 28 is located adjacent to a radially extending front wall of heel portion 30 and arranged to engage front wall 13 of bell end 10. A trough 22 is formed between bell side X and sealing portion side Y for receiving retainer bead 24 and pivoting thereabout. As explained in more detail below, trough 22 is configured to pivot about retainer bead 24 during insertion of spigot end 14 into bell end 10 and the subsequent pressurization of joint 16. This pivoting of segment 18 enables segment 18 to engage spigot end 14 and bell end 10 and form a wedge therebetween thereby preventing the separation of the interconnected pipes. Trough 22 is further configured to prevent over rotation of segment 18 about retainer bead 24 during the over pressurization of joint 16. This is accomplished by arranging trough to shear or deform bead 24 rather than rotate about bead to a point where the radial load exerted between the pipes becomes destructive to the pipes.

Referring to FIGS. 1 and 2, as joint 16 is assembled, a throat 21 of bell end 10 guides spigot end 14 until a beveled end 23 of spigot end 14 contacts a conical inner face of gasket 12. As spigot end 14 slides through gasket 12, retainer bead 24, which is engaged with annular groove 32 of gasket 12 and trough 22 of segment 18, prevents the gasket from dislodging from retainer groove 11. The wedging action between beveled end 23 and the conical inner face compresses sealing bulb portion 27 between spigot end 14 and compression rib 17 and sealing wall 19 thereby creating a seal between the interconnected pipes and pressing spigot tooth 20 into spigot end 14.

Upon pressurization of joint 16, an axial thrust force is created between spigot end 14 and bell end 10 that causes spigot end 14 to move axially from bell end 10. Separation of the pipes is prevented however by the interaction of segment 18 between bell end 10 and spigot end 14. In particular, referring to FIG. 3, as spigot end 14 begins to slide apart from bell end 10, one or more of spigot teeth 20 are caused to bite into spigot end 10, in part because of the pressure exerted on spigot tooth 20 by the compressed sealing portion 27. Thus, as spigot end 14 slides out of bell end 10, the pointed tips of spigot teeth 20 are caused to engage and bite into the pipe. As a result of the engagement of segment 18 with spigot end 14, gasket 12 and segment 18 are shifted forward, along with spigot end 14, in the direction of front wall 13 of retainer groove 11. When this occurs, annular groove 32 and trough 22 pivot about retainer bead 24 so that a backside of retainer bead 24 is brought to bear against a sealing portion side of trough 22. When this occurs, the further shifting of segment 18 causes it to pivot about retainer bead 24 thereby forming a wedge between bell end 10 and spigot end 14, the formation of which relies upon the axial thrust force created by the pressurization of joint 16 and a first load path 26 that is formed through trough 22 and spigot teeth 20 and between spigot end 14 and front wall 13 of bell end 10.

First load path 26 includes a radial load component and an axial load component. The radial load component serves an important purpose in that it ensures the formation of a wedging action of segment 18 between bell end 10 and spigot end 14. This is done by forcing at least one tooth of spigot teeth 20 radially inwardly into the axial outer surface of spigot end 14, while simultaneously forcing trough 22 of segment 18 radially outwardly against retainer bead 24 thereby compressing annular groove 32 of gasket 12. This action causes spigot teeth 20 to bite into spigot end 14 an acceptable distance and trough 22 to bear against retainer bead 22 where it is maintained in position between bead 24 and trough 22. Under these circumstances, load path 26 is arranged at an angle A relative to spigot end 14 that results in radial load that is sufficient to engage segment 18 between the pipes without spigot teeth 20 fracturing spigot end 14. However, as the hydrostatic pressure increases, angle A increases as segment 18 further rotates about retainer bead 24 thereby increasing the radial load and decreasing the axial load between the pipes. As such, the radial load component is proportional to the amount of rotation of trough 22 about bead 24 and the magnitude of the axial thrust force created by the pressurization of the pipes.

Depending on the size of the pipes, there is a point at which segment 18 begins to over-rotate about retainer bead 24. In prior art gaskets, this is marked by the over-impingement of the at least one tooth of row of teeth 20 into spigot end 14 and the consequent failure of spigot end 14 or bell end 10. In the present invention, over-rotation about retainer bead 24 is prevented by utilizing trough 22 and the axial thrust force created by the over-pressurization of joint 16 to impart an axial load against retainer bead 24 sufficient to shear or deform bead 24 rather than allow segment 18 over rotate about bead 24.

More particularly, to intentionally shear and/or deform bead 24, trough 22 is configured to engage less of bead 24 along the length of trough 22 and to more shallowly receive bead 24 than prior art metal retainer segments of this type. This is accomplished by increasing the radius of trough 22 over conventional, such as those described in U.S. Pat. Nos. 5,295,697 and 5,464,228. The radius of trough 22 will depend on the size of the gasket. That said, it has found that for 12 to 24 inch radius gaskets, the radius of trough 22 should range between 0.18 inch and 0.35 inch, preferably 0.2 inch. In this radius range, the arc length of the trough ranges between 0.40 inch and 0.45 inch, preferably 0.425 inch, and has an included angle of the radius of 120° to 135°, preferably 127°.

Configured in this manner, trough 22 effectively shears or deforms bead 24 before the radial load created by the fluid over-pressurization of the pipes and the pivoting of segment 18 about bead 24 become great enough to cause joint 16 to fail. Shearing and/or deforming bead 24 is made possible since trough 22 engages only a lower tip portion of bead 24, rather than the base of bead 24, and at an angle of contact between bead 24 and trough 22 of between 37° and 45°. By shearing or deforming bead 24, rather than continuing to rotate about it, first angle A of load path 26 is not allowed to increase to the point where the radial load becomes substantial enough to damage spigot end 14 or bell end 10. Instead, segment 18 shifts or translates axially toward front wall 13 rather than rotating further about bead 24. The shifting of segment 18 can deform bead 24 by pushing a portion of bead 24 toward front wall 13, for example, as shown in FIG. 4. Alternatively, the shifting of segment 18 can shear bead 24 away from bell end 10, for example, as shown in FIG. 4A. In either instance, the forward movement of segment ends when relatively blunt bell tooth 28 of segment 18 is pressed into the radially extending front wall 13 of bell end 10.

The engagement of bell tooth 28 with front wall 13 creates a second load path 34 through segment 18 and between bell end 10 and spigot end 14. Second load path 34 extends through bell tooth 28 and one more of spigot teeth 20 and forms a second angle B relative to spigot end 14 that is less than angle A through bead 24. Because angle B is less than angle A, the ratio of the radial load component to the axial load component exerted between bell end 10 and spigot end 14 along load path 34 is less than that of path 26 at the point bead 24 is sheared or deformed. Further, the total radial load exerted between the interconnected pipes is decreased upon the formation of second tooth path 34. This occurs in one of two ways. Specifically, when bead 24 is sheared away, as depicted in FIG. 4A, first load path 26 is eliminated altogether. In this instance, the only remaining load path between bell end 10 and spigot end 14 through segment 18 is along second load path 34. Since angle B of the second load path is less than angle A of the first load path, the radial load between the pipes is less than it was before bead 24 was sheared or deformed. Alternatively, when bead 24 is simply deformed, first load path 26 remains but the load carried along path 26 is much diminished by the failure of bead 24 to effectively support itself against trough 22, and the subsequent deformation of second load path 34, which as described above has a diminished radial load component compared to first load path 26. With the formation of second load path 34, the axial thrust force created by pressurization of the pipes is more effectively directed for preventing pipe separation since the resulting loads exerted through segment 18 are now exerted between the radial surface of front wall 13 at a reduced angle relative to angle A. In this manner, the ratio of the axial load component to the radial load component exerted against spigot end 14 is increased.

The advantage of the present invention is that it relies upon the arrangement of bead 24 and trough 22 to convert the axial thrust force caused by pipe pressurization to radial loads that cause spigot teeth 20 of segment 18 to engage with spigot end 14. Thereafter, the shallow arrangement of trough 22 allows segment 18 to disengage from bead 24, which is supported on the axial surface of bell end 10, and engage a radial surface of bell end 10 at front wall 13 at an angle relative to spigot end 14 that decreases the radial load component and increases the axial load component of the overall load exerted between bell end 10 and spigot end 14. As a result, a more effective and less destructive locking metal segment is provided.

As will be apparent to one skilled in the art, various modifications can be made within the scope of the aforesaid description. Such modifications being within the ability of one skilled in the art form a part of the present invention and are embraced by the claims below.

It is claimed:

1. A method for inhibiting separation of a bell end and a spigot end of a pair of pipes, the bell end including a groove having a front wall and a retainer bead, the method comprising,
   disposing a gasket within the bell end,
   inserting the spigot end into the bell end and through the gasket thereby pivoting a metal segment embedded within the gasket about the retainer bead away from the front wall, and compressing a sealing portion of the gasket between the bell end and the spigot end, and
   partially withdrawing the spigot end from the bell end a first distance thereby pivoting the metal segment about the retainer bead toward the front wall, impinging at least one tooth of a row of teeth of the metal segment directly upon the spigot end, and forming a first load path, followed by partially withdrawing the spigot end from the bell end a second distance thereby shearing the retainer bead and forming a second load path.

2. The method according to claim 1 further comprising terminating the first load path.

3. The method according to claim 1 wherein the first load path extends between the retainer bead and the spigot end and the second load path extends between the front wall and the spigot end.

4. The method according to claim 1 wherein a radial load exerted along the first load path is greater than that of the second load path.

5. The method according to claim 1 further comprising decreasing rotation of the segment about the retainer bead and facilitating the shearing of the retainer bead by engaging the retainer bead with a trough in the segment having a radius of less than 0.35 inch.

6. The method according to the claim 1 further comprising decreasing rotation of the segment about the retainer bead and facilitating the shearing of the retainer bead by engaging the retainer bead with a trough in the segment having an included angle of the radius of less than 130°.

7. The method according to the claim 1 further comprising decreasing rotation of the segment about the retainer bead and facilitating the shearing of the retainer bead by engaging the retainer bead with a trough in the segment having an angle of contact with the retainer bead of less than 48° prior to partially withdrawing the spigot end from the bell end.

8. The method according to claim 1 further comprising translating the segment toward the front wall when partially withdrawing the spigot end from the bell end the second distance.

9. The method according to claim 1 wherein the angle of the first load path at the time of shearing of the retainer bead is greater than that of the second load path.

10. A method for inhibiting separation of a bell end and a spigot end of a pair of pipes, the bell end including a groove having a front wall and a retainer bead, the method comprising,
    disposing a gasket within the bell end, the gasket including at least one metal segment having a radially inwardly extending tooth and a substantially axially extending tooth,
    inserting the spigot end into the bell end, and
    pressurizing the pair of pipes,
    wherein pressurizing the pair of pipes (i) impinges the radially extending tooth directly upon the spigot end thereby forming a first load path between the spigot end and the retainer bead, (ii) shifts the metal segment toward the front wall thereby deforming the retainer bead, and (iii) impinges the axially extending tooth directly against the front wall thereby forming a second load path between the spigot end and the retainer bead.

11. The method according to claim 10 wherein a radial load exerted along the first load path is greater than that of the second load path.

12. The method according to claim 10 wherein the angle of the first load path is greater than that of the second load path.

* * * * *

UNITED STATES PATENT AND TRADEMARK OFFICE
CERTIFICATE OF CORRECTION

PATENT NO. : 8,490,273 B1  
APPLICATION NO. : 12/901261  
DATED : July 23, 2013  
INVENTOR(S) : Daniel Copeland et al.

It is certified that error appears in the above-identified patent and that said Letters Patent is hereby corrected as shown below:

In the Claims

Claim 10, Col. 8, Line 32: replace "retainer bead" with "front wall"

Signed and Sealed this  
Tenth Day of December, 2013

Margaret A. Focarino  
*Commissioner for Patents of the United States Patent and Trademark Office*